United States Patent [19]

Wideman et al.

[11] Patent Number: 5,049,618

[45] Date of Patent: Sep. 17, 1991

[54] VULCANIZABLE RUBBER COMPOSITIONS CONTAINING HYDROXY ARYL SUBSTITUTED MONOMALEIMIDES

[75] Inventors: Lawson G. Wideman; Paul H. Sandstrom, both of Tallmadge, Ohio

[73] Assignee: The Goodyear Tire & Rubber Company, Akron, Ohio

[21] Appl. No.: 402,724

[22] Filed: Sep. 5, 1989

[51] Int. Cl.5 .............................. C08F 8/28; C08F 8/30
[52] U.S. Cl. .................................... 525/136; 525/138; 525/139; 525/141; 525/142
[58] Field of Search ............................................. 525/136

[56] References Cited

U.S. PATENT DOCUMENTS

| | | | |
|---|---|---|---|
| 2,895,850 | 7/1959 | Robison et al. | 525/935 |
| 3,265,708 | 8/1966 | Stiteler et al. | 260/326.5 |
| 4,605,696 | 8/1986 | Benko et al. | 524/432 |

FOREIGN PATENT DOCUMENTS

| | | |
|---|---|---|
| 60-163831 | 7/1985 | Japan . |
| 61-284391 | 12/1986 | Japan . |
| 3911986 | 12/1986 | Japan . |

OTHER PUBLICATIONS

"Vulcanization with Maleimides", P. O. Tawney et al, J. Applied Polymer Sci., 8, 2281(1964).
Chemical Abstracts Computer Literature/Patent Search.
Database Chemical Abstracts (HOST.STN), vol. 107, No. 8, 1987, Abstract No. 60481v, Columbus, Ohio, US & JP-A-62 025 137, Bridgestone Corp., 03 02 1987.

*Primary Examiner*—John C. Bleutge
*Assistant Examiner*—D. E. Aylward
*Attorney, Agent, or Firm*—Bruce J. Hendricks

[57] ABSTRACT

The present invention relates to vulcanizable rubber compositions containing a methylene donor and a hydroxy-aryl substituted monomaleimide. The substituted monomaleimides may be used as a replacement for resorcinol and function as a methylene acceptor. The vulcanizable rubber compositions exhibit improved rubber/reinforcement interaction for increased adhesion and tear in rubber. These vulcanizable rubber compositions also contain a vulcanizing agent.

13 Claims, No Drawings

VULCANIZABLE RUBBER COMPOSITIONS CONTAINING HYDROXY ARYL SUBSTITUTED MONOMALEIMIDES

BACKGROUND OF THE INVENTION

Many rubber articles, principally automobile tires, hoses, belts and the like are known as composites and are reinforced with fibers in cord form. In all such instances, the fiber must be firmly bonded to the rubber.

A frequent problem in making a rubber composite is maintaining good adhesion between the rubber and the reinforcement. A conventional method in promoting the adhesion between the rubber and the reinforcement is to pretreat the reinforcing fiber with a mixture of a rubber latex and a phenol-formaldehyde condensation product wherein the phenol is almost always resorcinol. This is the so called "RFL" (resorcinol-formaldehyde-latex) method. An alternative method of promoting such adhesion is to generate the resin in-situ (in the vulcanized rubber/textile matrix) by compounding a vulcanizing rubber stock composition with the phenol/-formaldehyde condensation product (hereinafter referred to as the "in-situ method"). The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol. The in situ method has been found to be particularly effective where the reinforcing material is steel wire since pretreatment of the wire with the RFL system has been observed to be largely ineffective.

Resorcinol is known to form a resin network within a rubbery polymer by reacting with various methylene donors. Unfortunately, the use of resorcinol has some inherent disadvantages. Resorcinol is not readily dispersed in rubber and in fact neither the resin, nor the resorcinol become chemically bound to the rubber. Additionally, resorcinol in its raw form is excessively volatile and is potentially toxic, thus posing a health hazard. Another disadvantage in using resorcinol is periodic market shortages of supply.

There have been numerous attempts to replace resorcinol, however, few if any have had much success. For example, in U.S. Pat. No. 4,605,696 there is disclosed a method for enhancing adhesion of rubber to reinforcing materials through the use of phenolic esters as the methylene acceptor. These phenolic esters are less volatile than resorcinol, but still offer no readily reactive site for chemically attaching the resin to the rubber.

Bismaleimides have been used in rubber as vulcanization agents and increase the stiffness of diene rubber. The maleimide tail is believed to react with the diene-activated radical sites on the polymer generated by chemical, mechanical or thermal means, and increase the crosslinking network in the rubber. Unfortunately, bismaleimides do not reinforce the rubber by the formation of a resin network within the rubber.

Therefore, there exists a need to find a suitable replacement for resorcinol in an in-situ resin system while concomitantly improving rubber/reinforcement interaction for increased adhesion and tear in rubber.

SUMMARY OF THE INVENTION

The present invention relates to a vulcanizable rubber composition comprising a natural or synthetic rubber, a vulcanizing agent and the reaction product of (a) a methylene donor and (b) a methylene acceptor of the formula:

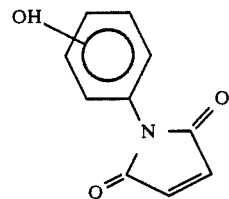

DETAILED DESCRIPTION OF THE PREFERRED EMBODIMENT

The present invention relates to the incorporation of a hydroxy aryl substituted monomaleimide in a sulfur vulcanizable rubber. An advantage of the present invention is the hydroxy aryl substituted monomaleimide exhibits low volatility and resembles the reactivity of resorcinol in the in-situ resin method. The hydroxy aryl substituted monomaleimides also possess the maleimide "tail" for attachment to the diene polymer.

In a preferred embodiment, the present invention relates to a vulcanizable rubber composition comprising: (1) a natural or synthetic rubber, (2) a sulfur vulcanizing agent, (3) from about 0.5 to about 50 phr of a methylene donor, and (4) from about 0.5 to about 50 phr of a hydroxy aryl substituted monomaleimide represented by the formula:

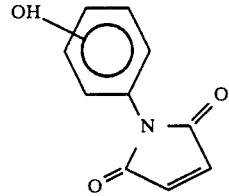

For purposes of the present invention, the compounds of the above formula are used as the methylene acceptor. The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reactant that contributes the moiety that later forms into the methylene bridge is the methylene donor wherein the other reactant is the methylene acceptor.

Representative of the compounds of the above formula are N-(3-hydroxyphenyl) maleimide (3-HPM) and N-(4-hydroxyphenyl) maleimide (4-HPM).

The hydroxy phenyl monomaleimides that may be used in the present invention are publicly known. For example, 4-hydroxyphenylmaleimide has been used to prepare heat-resistant electric insulators, see Fukami, et al., Japan. Kokai Tokyo Koho JP 54/14500 [79/14500] (1979). In addition, N-(p-hydroxyphenyl) maleimide has been polymerized with oligomeric polyester, see Rositskii, et al., Ukr. Khim, Zh. (Russ. Ed.), 48(9), 997–1001. U.S. Pat. No. 4,683,276 discloses the preparation of N-(3-hydroxyphenyl)maleimide from m-aminophenol and maleic anhydride.

The amount of hydroxy aryl substituted monomaleimide that is included in the rubber composition may vary depending upon the type of rubber and the desired physical properties, i.e., adhesion and tear. Generally speaking, the amount may range from about 0.1 to about 50 parts by weight per 100 parts by weight rubber (phr). Preferably, the amount of HPM ranges from about 0.5 to about 5.0 phr.

The combination of the substituted monomaleimide with a methylene donor improves the properties of "sulfur vulcanizable elastomers or rubbers". The term "sulfur vulcanizable elastomer or rubber" as used herein embraces both natural and all its various raw and reclaim forms as well as various synthetic rubbers. Representative synthetic polymers include the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylenes, for example, vinyl acetylene; olefins, for example, isobutylene, which copolymerizes with isoprene to form butyl rubber; vinyl compounds, for example, acrylic acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-polyisoprene and similar synthetic rubbers.

Specific examples of synthetic rubbers includes neoprene (polychloroprene), polybutadiene (including trans- and cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as theylene/propylene/diene monomer (EPDM) and in particular ethylene/propylene/dicyclopentadiene terpolymers. The preferred rubbers for use in the present invention are polybutadiene, polyisobutylene, EPDM, butadiene-styrene copolymers, cis, 1,4-polyisoprene and polychloroprenes.

The vulcanizable rubber composition of the present invention contain a methylene donor. The term "methylene donor" is intended to mean a compound capable of reacting with the hydroxy aryl substituted monomaleimides and generate the resin in-situ.

Examples of methylene donors which are suitable for use in the present invention include hexamethylene tetramine, hexaethoxymethylmelamine, hexamethoxymethylmelamine, laurlyoxymethylpyridinium chloride, ethyoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

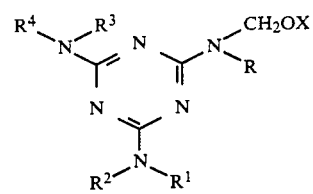

wherein X is an alkyl having 1 to 8 carbon atoms: R, $R^1$, $R^2$, $R^3$ and $R^4$ are individually selected from hydrogen, alkyl having from 1 to 8 carbon atoms, the group —CH$_2$OX or their condensation products. Specific methylene donors include hexakis(methoxymethyl) melamine, N,N',N''-trimethyl/N,N',N''-trimethylolmelamine, hexamethylolmelamine, N,N',N''-dimethylolmelamine, N-methylolmelamine, N,N'-dimethylolmelamine, N,N',N''-tris(methoxymethyl) melamine and N,N',N''tributyl-N,N',N''-trimethylolmelamine. The N-methylol derivatives of melamine are prepared by known methods.

The weight ratio of methylene donor to the hydroxyl aryl substituted monomaleimide can vary. Generally speaking, the weight ratio will range from about 1:10 to about 10:1. Preferably, the weight ratio ranges from about 1:3 to 3:1.

The vulcanizable rubber composition of the present invention contains a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the type of rubber and the particular type of sulfur vulcanizing agent that is used. Generally speaking, the amount of sulfur vulcanizing agent ranges from about 0.1 to about 5 phr with a range of from about 0.5 to about 2 being preferred.

The vulcanizable rubber composition for use in forming a composite with reinforcing material may be used in the manufacture of tires, belts or hoses. The rubber vulcanizate which is to be used to form the composite may contain conventional compounding ingredients such as carbon black, antidegradants, zinc oxide, accelerators, silica, processing and softening oils and the like. The methylene acceptor may be compounded in either the productive or nonproductive stock. Preferably, the methylene acceptor is compounded in the nonproductive stock because more uniform mixing is generally achieved. Incorporation of the methylene acceptor into the sulfur vulcanizable rubber may be accomplished by conventional means of mixing such as by the use of a Banbury or Brabender.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Babbit (Norwalk, Conn., R. T. Vanderbilt Company, Inc., 1978), pages 583–591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the various rubber formulations that were prepared. These properties include a torque minimum (Min Torque), a torque maximum (Max Torque), the total increase in torque (Delta Torque), minutes to 25% of the torque increase (t25 min.), and minutes to 90% of the torque increase (t90 min.).

Strebler adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

Adhesion to nylon was evaluated using the Tire Cord Adhesion Test (TCAT). Samples were prepared and tested according to the procedures described by D. W. Nicholson, D. I. Livingston, and G. S. Fielding-Russell, *Tire and Technology* (1978) 6, 114: G. S. Fielding-Russell and D. I. Livingston, *Rubber Chemistry and Technology* (1980) 53, 950: and R. L. Rongone, D. W. Nicholson and R. E. Payne, U.S. Pat. No. 4,095,465 (June 20, 1978).

The following examples are presented in order to illustrate but not limit the present invention.

EXAMPLE 1

Preparation of N-(3-hydroxyphenyl)-maleimide

A one-liter flask containing 52.8 grams (0.53 mole) of maleic anhydride dissolved in 200 ml of m-xylene was slowly charged with 55.0 grams (0.50 mole) of 3-aminophenol. The reaction temperature was maintained below 50° C. with cooling. Five grams of para-toluenesulfonic acid was then added to the flask and the reactor contents heated to reflux with a pot temperature of 148°–150° C. Water removal was complete after 8 hours of reflux under nitrogen with a Dean-Stark trap. The flask was cooled, xylene decanted, and the remaining product dried under reduced pressure. One hundred two grams of crude product containing N-(3-hydroxyphenyl) maleimide were recovered.

EXAMPLE 2

Physical Testing

Table I below shows the basic rubber compound that was used in this example. The rubber compound was prepared in a three-stage Banbury mix. All parts and percentages are by weight unless otherwise noted.

The various samples were prepared using the respective amount (phr) of resin components listed in Table II and Table III. The cure data as well as other physical data for each sample are listed in each Table.

TABLE I

| | |
|---|---|
| 1st Non-Productive | |
| Natural Rubber (#2 ribbed smoked sheet) | 100.0 |
| SAF Carbon Black | 15.0 |
| 2nd Non-Productive | |
| SAF Carbon Black | 35.0 |
| Processing Oil | 5.0 |
| Stearic Acid | 1.0 |
| Zinc Oxide | 5.0 |
| Antioxidant | 2.0 |
| N-(3-hydroxyphenyl)maleimide | Varied |
| N-(4-hydroxyphenyl)maleimide | Varied |
| Resorcinol | Varied |
| Productive | |
| Sulfur, Accelerator, Retarder | 3.2 |
| Hexamethoxymethyl Melamine | Varied |
| Hexamethylenetetramine | Varied |

TABLE II

| | (Series 1) | | | | | |
|---|---|---|---|---|---|---|
| SAMPLE | A | B | C | D | E | F |
| Resorcinol | 0 | .75 | 1.5 | 0 | 0 | 0 |
| Hexamethylene tetramine | 0 | 1.5 | 0 | 0 | 1.5 | 0 |
| Hexamethoxymethyl melamine | 0 | 0 | 1.5 | 0 | 0 | 1.5 |
| N-(3-hydroxyphenyl)-maleimide | 0 | 0 | 0 | 1.5 | .75 | 1.5 |
| Max. Torque | 39.4 | 47.6 | 46.4 | 39.1 | 46.2 | 39.9 |
| Min. Torque | 11.0 | 12.3 | 11.4 | 10.0 | 11.1 | 10.8 |
| Δ Torque | 28.4 | 35.3 | 35.0 | 29.1 | 35.1 | 29.1 |
| t90 (min.) | 22.6 | 20.4 | 24.5 | 21.3 | 16.7 | 24.1 |
| t25 (min.) | 15.0 | 9.9 | 14.9 | 13.9 | 8.9 | 14.1 |
| Tensile Strength at Break, MPa | 21.7 | 26.6 | 24.7 | 23.1 | 29.1 | 24.0 |
| Elongation at break, % | 487 | 502 | 486 | 519 | 540 | 530 |
| Modulus (300%), MPa | 11.1 | 14.3 | 13.4 | 11.5 | 14.8 | 11.9 |
| Zwick Rebound at room temperature) % | 56.5 | 58.5 | 56.0 | 53.5 | 58.5 | 56.0 |
| Zwick Rebound (at 100° C.), % | 68.0 | 70.0 | 67.5 | 65.0 | 70.5 | 68.5 |
| Instron Tear | 1036.0 | 1052.0 | 1186.0 | 1036.0 | 1176.0 | 996.0 |

TABLE II-continued
(Series 1)

| SAMPLE | A | B | C | D | E | F |
|---|---|---|---|---|---|---|
| (at room temperature) Newtons per inch | | | | | | |
| Strebler Adhesion to Itself (95° C.) Newtons per inch | 164.0 | 159.0 | 184.0 | 196.0 | 222.0 | 241.0 |
| Nylon Adhesion Newtons | 22.1 | 25.0 | 28.2 | 27.2 | 31.3 | 24.3 |

TABLE III
(Series 2)

| SAMPLE | G | H | I | J | K |
|---|---|---|---|---|---|
| Resorcinol | 0 | 0.75 | 1.50 | 0 | 0 |
| Hexamethylene tetramine | 0 | 1.50 | 0 | 1.50 | 0 |
| Hexamethoxymethyl melamine | 0 | 0 | 1.50 | 0 | 1.5 |
| N-(4-hydroxyphenyl) maeimide | 0 | 0 | 0 | 1.30 | 2.6 |
| Max Torque | 43.6 | 48.2 | 50.5 | 47.6 | 42.7 |
| Min Torque | 14.1 | 14.0 | 15.8 | 11.9 | 12.1 |
| Δ Torque | 29.5 | 34.2 | 34.7 | 35.7 | 30.6 |
| t90 (min.) | 24.1 | 19.1 | 25.6 | 19.5 | 29.2 |
| t25 (min.) | 16.2 | 10.9 | 15.6 | 11.1 | 18.4 |
| TS | 21.72 | 23.58 | 22.26 | 20.9 | 19.9 |
| EB | 478 | 472 | 433 | 441 | 461 |
| $M_{100}$ | 2.11 | 2.51 | 2.81 | 2.49 | 2.33 |
| $M_{300}$ | 11.13 | 12.93 | 13.83 | 12.52 | 11.24 |
| Rebound, RT | 49.2 | 50.3 | 48.6 | 46.0 | 46.0 |
| Rebound, 100° C. | 60.4 | 60.3 | 57.9 | 58.0 | 56.7 |
| Strebler Adhesion | 164 | 198 | 165 | 212 | 293 |
| Rheovibron E'/Tan, 0° C. | 18.4/.150 | 28.0/.132 | 29.4/.124 | 27.7/.116 | 28.2/.130 |
| E'/Tan, 60° C. | 11.4/.109 | 18.6/.093 | 19.0/.098 | 19.6/.082 | 19.1/.098 |

The replacement of resorcinol with 3HPM or 4HPM gives a resin formation as indicated by increased modulus (300%) over the control. The increase in Strebler adhesion over the control and over the formulation containing resorcinol indicates attachment of the resin to the diene rubber through the monomaleimide tail. The combination of increased modulus and tear resistance is highly desirable and extremely difficult to achieve.

What is claimed is:

1. A vulcanizable rubber composition comprising a sulfur vulcanizable rubber, a vulcanizing agent and the reaction product of (a) a methylene donor and (b) a methylene acceptor of the formula:

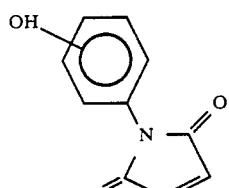

2. The composition of claim 1 wherein the methylene acceptor is:

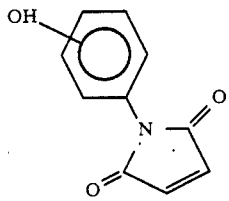

3. The composition of claim 1 wherein the methylene acceptor is:

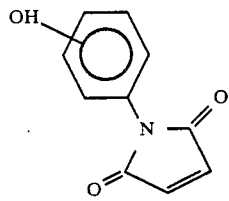

4. The composition of claim 1 wherein the rubber is selected from the group consisting of natural rubber, polychloroprene, polybutadiene, polyisoprene, butyl rubber, EPDM, styrene/butadiene copolymers, terpolymers of acrylonitrile, butadiene and styrene and blends thereof.

5. The composition of claim 1 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

6. The composition according to claim 1 wherein the methylene donor is selected from the general formula:

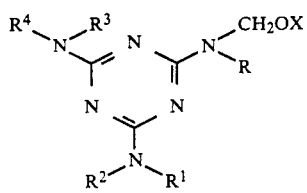

wherein X is an alkyl having from 1 to 8 carbon atoms, R, $R^1$, $R^2$, $R^3$ and $R^4$ are individually selected from the group consisting of hydrogen, an alkyl having from 1 to 8 carbon atoms, the group —CH$_2$OX or their condensation products.

7. The composition of claim 1 wherein the methylene donor is selected from the group consisting of hexakis(methoxymethyl)melamine, N,N',N''-trimethyl/N,N',N''-trimethylolmelamine, hexamethylolmelamine, N,N',N''-dimethylolmelamine, N-methylolmelamine, N,N'-dimethylolmelamine, N,N',N''tris(methoxymethyl) melamine and N,N',N''tributyl-N,N',N''-trimethylolmelamine.

8. The composition of claim 1 wherein the weight ratio of methylene donor to the hydroxy aryl substituted monomaleimide may range of from 1:10 to about 10:1.

9. The composition of claim 8 wherein the weight ratio of methylene donor to the hydroxyl aryl monomaleimide may range from about 1:3 to about 3:1.

10. The composition of claim 1 wherein the sulfur vulcanizing agent is selected from the group consisting of elemental sulfur, an amine disulfide, polymeric polysulfide or sulfur olefin adduct.

11. The composition of claim 10 wherein the sulfur vulcanizing agent ranges from about 0.1 to about 5 phr.

12. The composition of claim 1 wherein the amount of the hydroxy aryl substituted monomaleimide that is included in the sulfur vulcanizable rubber may range from about 0.1 to about 50 phr.

13. The composition of claim 12 wherein the amount of the hydroxy aryl substituted monomaleimide may range from about 0.5 to about 5.0 phr.

* * * * *